(12) United States Patent
Yoshioka et al.

(10) Patent No.: US 11,974,267 B2
(45) Date of Patent: Apr. 30, 2024

(54) TERMINAL, RADIO COMMUNICATION SYSTEM, AND COMMUNICATION METHOD SUPPORTING INTER-TERMINAL DIRECT COMMUNICATION

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 241 days.

(21) Appl. No.: 17/417,292

(22) PCT Filed: Dec. 27, 2018

(86) PCT No.: PCT/JP2018/048384
§ 371 (c)(1),
(2) Date: Jun. 22, 2021

(87) PCT Pub. No.: WO2020/136854
PCT Pub. Date: Jul. 2, 2020

(65) Prior Publication Data
US 2022/0078805 A1    Mar. 10, 2022

(51) Int. Cl.
*H04W 72/121* (2023.01)
*H04L 1/08* (2006.01)
*H04L 1/1812* (2023.01)
*H04W 72/542* (2023.01)

(52) U.S. Cl.
CPC ............ *H04W 72/121* (2013.01); *H04L 1/08* (2013.01); *H04L 1/1812* (2013.01); *H04W 72/542* (2023.01)

(58) Field of Classification Search
CPC .... H04W 72/121; H04W 72/542; H04L 1/08; H04L 1/1812
See application file for complete search history.

(56) References Cited

U.S. PATENT DOCUMENTS

2019/0052436 A1* 2/2019 Desai .................... H04L 5/0055
2021/0250132 A1* 8/2021 Chen .................... H04L 69/324

OTHER PUBLICATIONS

International Search Report issued in PCT/JP2018/048384 dated Mar. 19, 2019 (5 pages).
Written Opinion of the International Searching Authority issued in PCT/JP2018/048384 dated Mar. 19, 2019 (3 pages).
3GPP TS 36.211 V15.3.0; "3rd Generation Partnership Project; Technical Specification Group Radio Access Network; Evolved Universal Terrestrial Radio Access (E-UTRA); Physical channels and modulation (Release 15)"; Sep. 2018 (243 pages).

(Continued)

*Primary Examiner* — Won Tae C Kim
(74) *Attorney, Agent, or Firm* — Osha Bergman Watanabe & Burton LLP

(57) ABSTRACT

A user equipment includes a transmitter that performs a groupcast transmission to a group including a plurality of units of user equipment; a receiver that receives a hybrid automatic repeat request (HARQ) response to the groupcast transmission; and a controller that performs retransmission control for the groupcast based on received power that is measured on a channel for receiving the HARQ response.

3 Claims, 10 Drawing Sheets

(56) References Cited

OTHER PUBLICATIONS

3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).
3GPP TSG RAN WG1 Meeting #79; R1-144643 "Discussion on D2D resource pool allocations" Fujitsu; San Francisco, USA; Nov. 17-21, 2014 (4 pages).
3GPP TSG RAN1 Meeting #95; R1-1812618 "Discussion on Physical layer procedures in NR V2X" CATT; Spokane, USA; Nov. 12-16, 2018 (9 pages).
3GPP TSG RAN WG1 Meeting #95; R1-1813422 "Physical layer procedures for HARQ operation for groupcast and unicast transmissions" Qualcomm Incorporated; Spokane, USA; Nov. 12-16, 2018 (7 pages).
Office Action issued in Japanese Application No. 2020-562256; dated Dec. 6, 2022 (5 pages).
3GPP TSG RAN WG1 Meeting #95; R1-1812365 "Discussion on physical layer procedure" MediaTek Inc.; Spokane, USA; Nov. 12-16, 2018 (6 pages).
Extended European Search Report issued in European Application No. 18945156.0, dated Jul. 14, 2022 (6 pages).
Office Action in the counterpart Chinese Application No. 201880100037.8, dated Jul. 27, 2023 (14 pages).

* cited by examiner

TERMINAL, RADIO COMMUNICATION SYSTEM, AND COMMUNICATION METHOD SUPPORTING INTER-TERMINAL DIRECT COMMUNICATION

TECHNICAL FIELD

The present invention relates to user equipment in a radio communication system.

BACKGROUND ART

For LTE (Long Term Evolution) and LTE successor systems (e.g., LTE-A (LTE Advanced), NR (New Radio) (which is also referred to as 5G), D2D (Device to Device) technology has been studied in which units of user equipment communicate directly with each other without going through a base station apparatus (e.g., Non-Patent Document 1).

D2D reduces traffic between user equipment and a base station apparatus, and D2D allows communication between units of user equipment, even if a base station apparatus is unable to communicate during a disaster or the like. In 3GPP (3rd Generation Partnership Project), D2D is referred to as "sidelink." However, in this specification, a more generic term, D2D, is used. Note that, in the embodiments described below, "sidelink" is also used, as necessary.

D2D communication is broadly classified into D2D discovery (which may also be referred to as D2D discovery or D2D detection) for detecting another unit of user equipment that is capable of communicating; and D2D communication (which may also be referred to as D2D direct communication, D2D communication, inter-terminal direct communication, or the like) for direct communication between units of user equipment. In the following, if D2D communication, D2D discovery, and the like are not particularly distinguished, they are simply referred to as D2D. Furthermore, signals transmitted and received in D2D are referred to as D2D signals. Various use cases of services related to NR V2X (Vehicle to Everything) have been studied (e.g., Non-Patent Document 2).

RELATED ART DOCUMENT

Non-Patent Document

Non-Patent Document 1: 3GPP TS 36.211 V15.3.0 (2018-09)
Non-Patent Document 2: 3GPP TR 22.886 V15.1.0 (2017-03)

SUMMARY OF THE INVENTION

Problem to be Solved by the Invention

For inter-terminal direct communication in NR-V2X, supporting Hybrid automatic repeat request (HARQ) is being studied. However, for inter-terminal direct communication according to related art, HARQ processing has not been supported.

The present invention has been accomplished in view of the above-described point, and an object is to appropriately execute retransmission control in inter-terminal direct communication.

Means for Solving the Problem

According to the disclosed technology, there is provided a user equipment including a transmitter that performs a groupcast transmission to a group including a plurality of units of user equipment; a receiver that receives a hybrid automatic repeat request (HARQ) response to the groupcast transmission; and a controller that performs retransmission control for the groupcast based on received power that is measured on a channel for receiving the HARQ response.

Advantage of the Invention

According to the disclosed technology, retransmission control can be appropriately executed in inter-terminal direct communication.

EMBODIMENTS OF THE INVENTION

In the following, embodiments of the present invention are described in reference to the drawings. The embodiments described below are examples, and embodiments to which the present invention is applied are not limited to the following embodiments.

In an operation of a radio communication system of the embodiments of the present invention, existing technology is appropriately used. Here, the existing technology is, for example, existing LTE but not limited to existing LTE. Further, the term "LTE" used in this specification has a broad meaning including LTE-Advanced and a system subsequent to LTE-Advanced (for example, NR), or a wireless Local Area Network (LAN) unless as otherwise specified.

In the embodiments of the present invention, a duplex method may be a Time Division Duplex (TDD) method, a Frequency Division Duplex (FDD) method, or any other method (e.g., Flexible Duplex, or the like).

Furthermore, in an embodiment of the present invention, when a radio parameter or the like is "configured", it may mean that a predetermined value is "pre-configured" or it may mean that a radio parameter provided by notification from the base station apparatus 10 or the user equipment 20 is configured.

Figure 1:
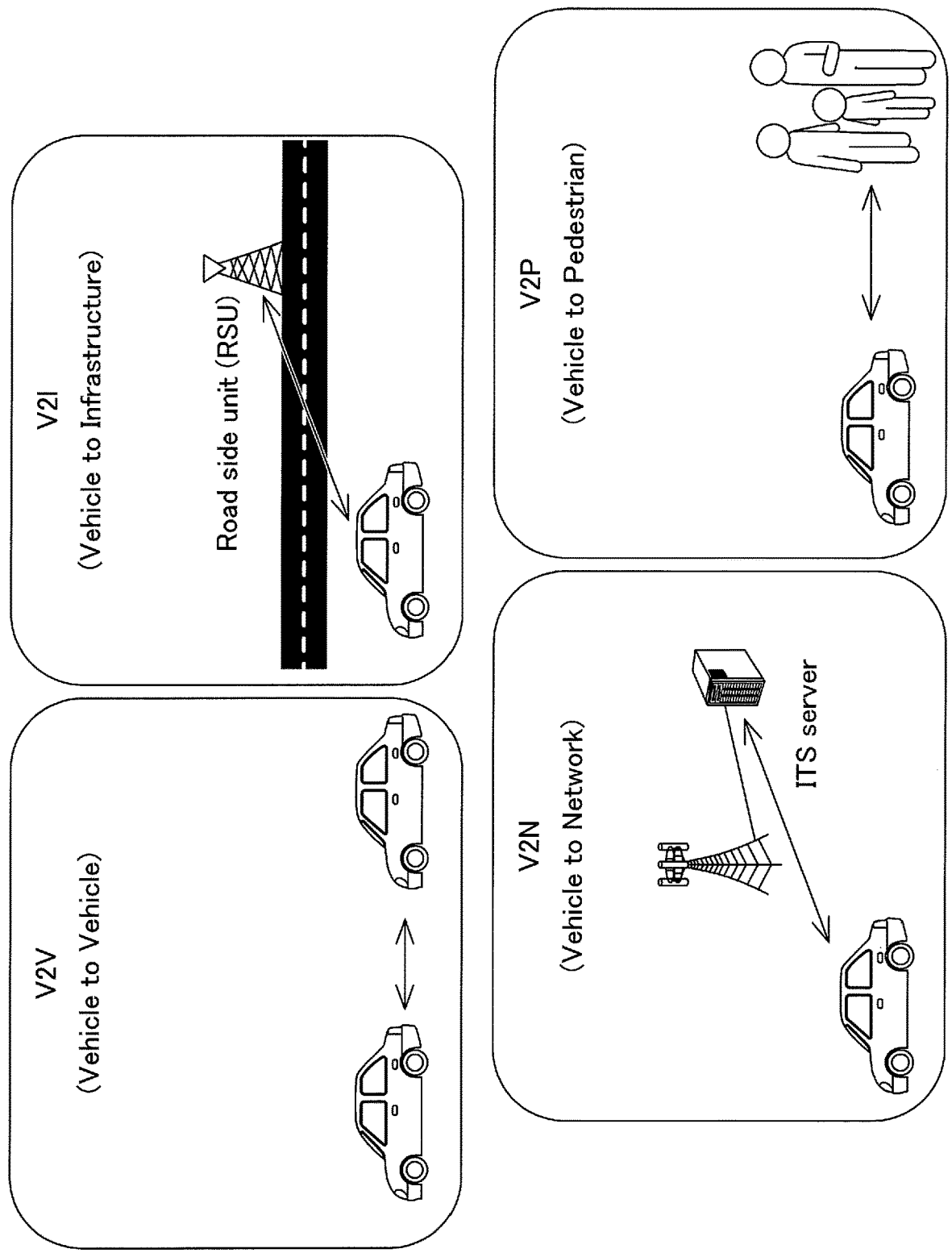
FIG. 1 is a diagram for illustrating V2X.

FIG. 1 is a diagram for illustrating V2X. In 3GPP, implementation of vehicle to everything (V2X) or enhanced V2X (eV2X) by extending a D2D function has been studied, and technical specification documentation development thereof is in progress. As illustrated in FIG. 1, V2X is a part of intelligent transport systems (ITS) and is a generic term of vehicle to vehicle (V2V) meaning a communication mode performed between vehicles, vehicle to infrastructure (V2I) meaning a communication mode performed between a vehicle and a road-side unit (RSU) installed on a road side, vehicle to Network (V2N) meaning a communication mode performed between a vehicle and an ITS server, and vehicle to pedestrian (V2P) meaning a communication mode performed between a vehicle and a mobile terminal carried by a pedestrian.

Furthermore, in 3GPP, V2X has been studied that uses cellular communication and inter-terminal communication according to LTE or NR. V2X using cellular communication may be referred to as cellular V2X. For NR V2X, a study has been progressed to achieve a large capacity, low latency, high reliability, and Quality of Service (QoS) control.

It is assumed that, in V2X according to LTE or NR, a study that is not limited to the 3GPP specification will be progressed. For example, it is expected that the following items will be studied: ensuring interoperability; cost efficiency for implementing a higher layer; combining or switching multiple RATs (Radio Access Technologies); supporting regulations in each country; and data retrieving, delivering, database management, and use of a V2X platform according to LTE or NR.

In the embodiments of the present invention, a form in which the communication device is installed on a vehicle is mainly assumed, but embodiments of the present invention are not limited to this form. For example, the communication device may be a terminal carried by a person, the communication device may be a device installed in a drone or an aircraft, and the communication device may be a base station, an RSU, a relay station (relay node), a user equipment provided with scheduling capability, or the like.

Note that sidelink (SL) may be distinguished from uplink (UL) or downlink (DL) based on one of the following 1) to 4) or a combination thereof. Furthermore, SL may have any other name.

1) A resource allocation in a time domain
2) A resource allocation in a frequency domain
3) A synchronization signal to be referred to (including a sidelink synchronization signal (SLSS))
4) A reference signal used for path loss measurement for transmission power control.

Furthermore, for orthogonal frequency division multiplexing (OFDM) of SL or UL, any one of cyclic-prefix OFDM (CP-OFDM), discrete Fourier transform-spread-OFDM (DFT-S-OFDM), OFDM without transform precoding, and OFDM with transform precoding may be applied.

In SL of LTE, Mode 3 and Mode 4 are specified for SL resource allocation to the user equipment 20. In Mode 3, transmission resources are dynamically allocated in accordance with downlink control information (DCI) transmitted from the base station apparatus 10 to the user equipment 20. In Mode 3, semi-persistent scheduling (SPS) can be performed as well. In Mode 4, the user equipment 20 autonomously selects transmission resources from a resource pool.

A slot in an embodiment of the present invention may be replaced with a symbol, a mini slot, a subframe, a radio frame, a transmission time interval (TTI), or the like. Furthermore, a cell in an embodiment of the present invention may be replaced with a cell group, a carrier component, a BWP, a resource pool, a resource, a Radio Access Technology (RAT), or a system (including a wireless LAN).

Figure 2:
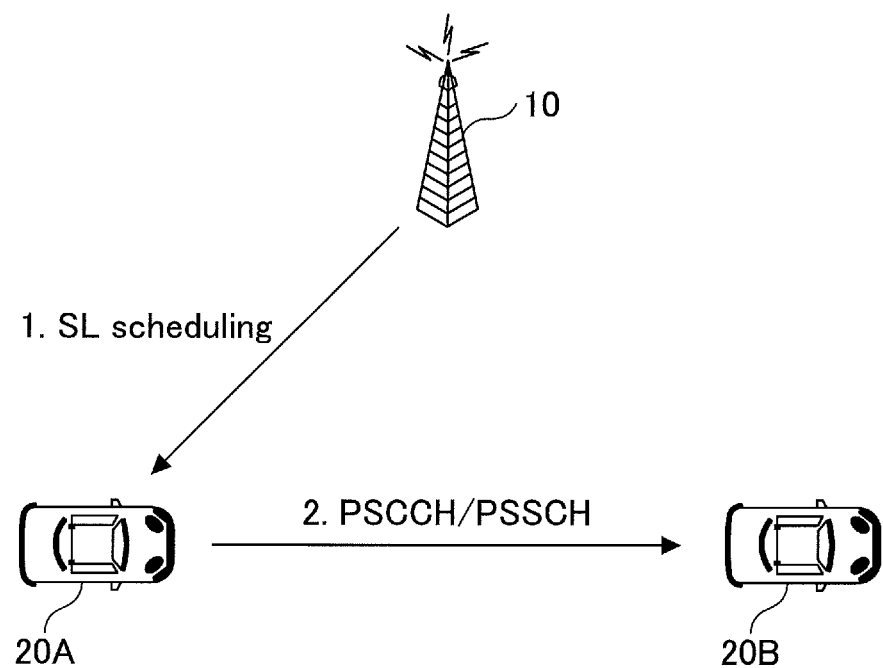
FIG. 2 is a diagram for illustrating an example (1) of a transmission mode of V2X.

FIG. 2 is a diagram for illustrating an example (1) of transmission mode of V2X. In a sidelink communication transmission mode illustrated in FIG. 2, in step 1, the base station apparatus 10 transmits sidelink scheduling to user equipment 20A. Subsequently, the user equipment 20A transmits a Physical Sidelink Control Channel (PSCCH) and a Physical Sidelink Shared Channel (PSSCH) to the user equipment 20B based on the received scheduling (step 2). The transmission mode of the sidelink communication illustrated in FIG. 2 may be referred to as a sidelink transmission mode 3 in LTE. The sidelink transmission mode 3 in LTE performs Uu-based sidelink scheduling. Uu is a radio interface between Universal Terrestrial Radio Access Network (UTRAN) and User Equipment (UE). Note that the transmission mode of sidelink communication illustrated in FIG. 2 may be referred to as a sidelink transmission mode 1 in NR.

Figure 3:
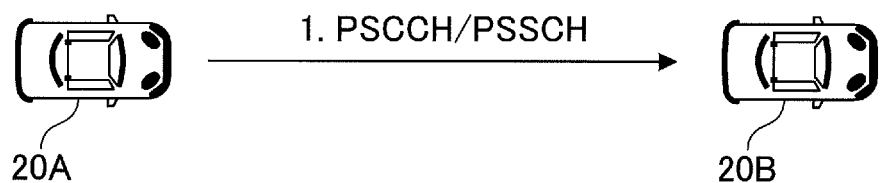
FIG. 3 is a diagram for illustrating an example (2) of a transmission mode of V2X.

FIG. 3 is a diagram for illustrating an example (2) of transmission mode of V2X. In a sidelink communication transmission mode illustrated in FIG. 3, in step 1, the user equipment 20A transmits PSCCH and PSSCH to the user equipment 20B using an autonomously selected resource. The transmission mode of the sidelink communication illustrated in FIG. 3 may be referred to as a sidelink transmission mode 4 in LTE. In the sidelink transmission mode 4 in LTE, the user equipment 20A itself performs resource selection.

Figure 4:
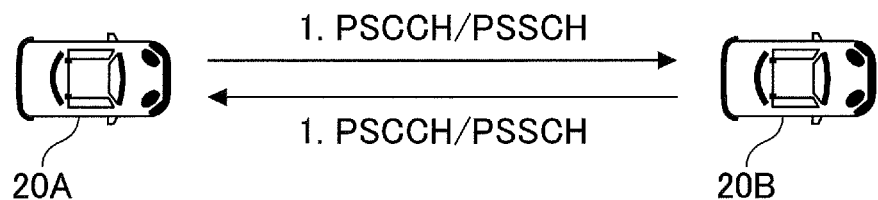
FIG. 4 is a diagram for illustrating an example (3) of a transmission mode of V2X.

FIG. 4 is a diagram for illustrating an example (3) of transmission mode of V2X. In the sidelink communication transmission mode illustrated in FIG. 4, in step 1, the user equipment 20A transmits PSCCH and PSSCH to the user equipment 20B using an autonomously selected resource. Likewise, the user equipment 20B transmits PSCCH and PSSCH to the user equipment 20A using an autonomously selected resource (step 1). The transmission mode of sidelink communication illustrated in FIG. 4 may be referred to as a sidelink transmission mode 2a in NR. In the sidelink transmission mode 2 in NR, the user equipment 20 itself that transmits PSCCH and PSSCH executes resource selection.

Figure 5:
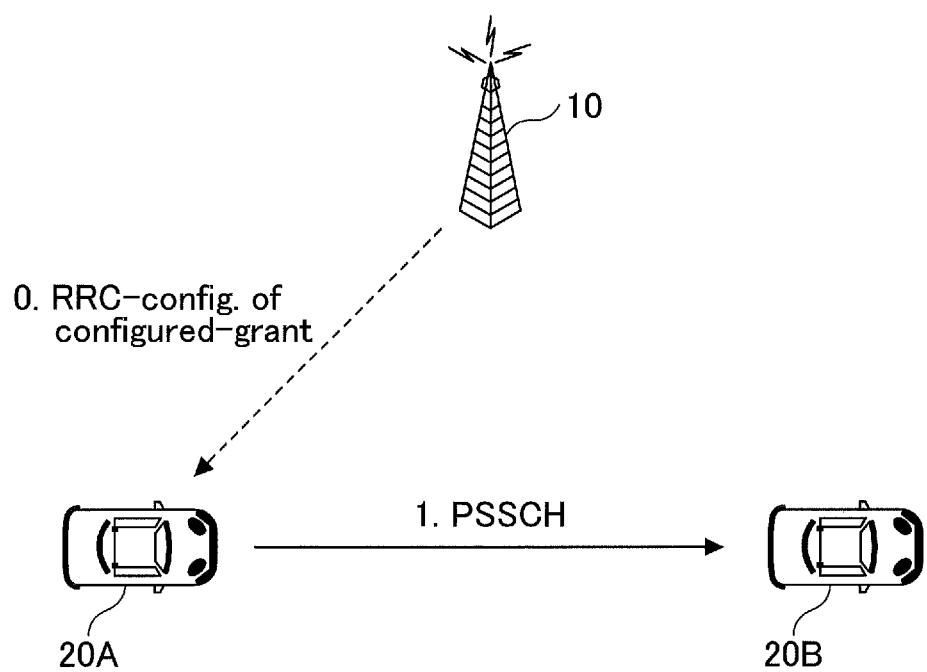
FIG. 5 is a diagram for illustrating an example (4) of a transmission mode of V2X.

FIG. 5 is a diagram for illustrating an example (4) of transmission mode of V2X. In the sidelink communication transmission mode illustrated in FIG. 5, in step 0, the base station apparatus 10 transmits a scheduling grant of a sidelink to the user equipment 20A via a Radio Resource Control (RRC) configuration. Subsequently, the user equipment 20A transmits PSSCH to the user equipment 20B based on the received scheduling (step 1). Alternatively, the user equipment 20A transmits PSSCH to the user equipment 20B based on a configuration predefined by a technical specification document. The transmission mode of sidelink communication illustrated in FIG. 5 may be referred to as a sidelink transmission mode 2c in NR.

Figure 6:
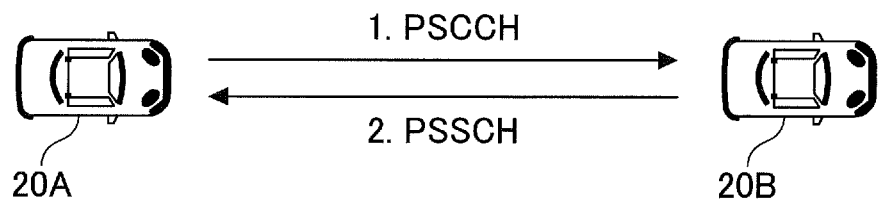
FIG. 6 is a diagram for illustrating an example (5) of a transmission mode of V2X.

FIG. 6 is a diagram for illustrating an example (5) of transmission mode of V2X. In a sidelink communication transmission mode illustrated in FIG. 6, in step 1, the user equipment 20A transmits sidelink scheduling to the user equipment 20B via PSCCH. Subsequently, the user equipment 20B transmits PSSCH to the user equipment 20A based on the received scheduling (step 2). That is, one user equipment 20 schedules another user equipment 20. The transmission mode of the sidelink communication illustrated in FIG. 6 may be referred to as a sidelink transmission mode 2d in NR.

Figure 7:
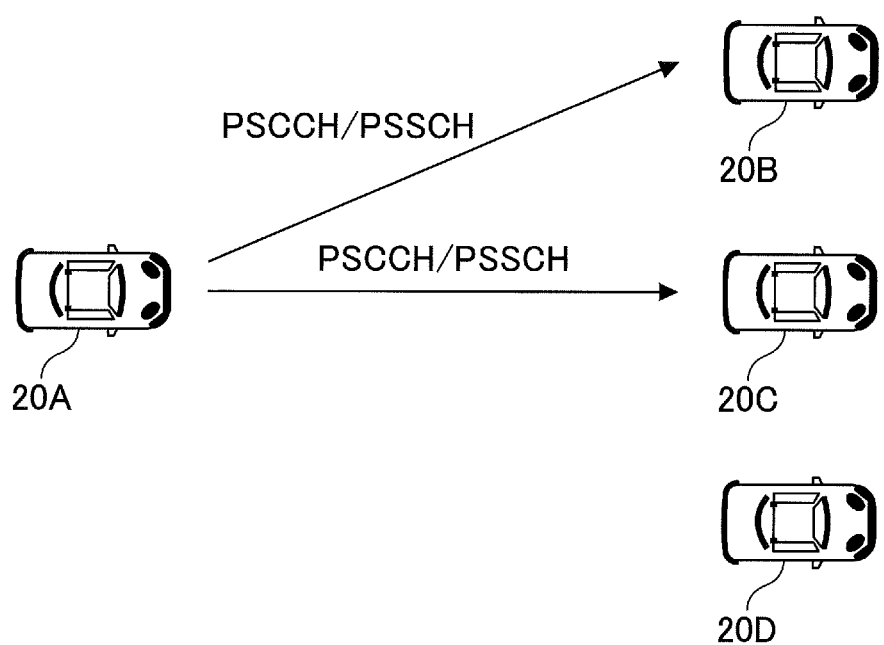
FIG. 7 is a diagram for illustrating an example (1) of a communication type of V2X.

FIG. 7 is a diagram for illustrating an example (1) of a communication type of V2X. The communication type of the sidelink illustrated in FIG. 7 is unicast. The user equipment 20A transmits PSCCH and PSSCH to the user equipment 20. In the example illustrated in FIG. 7, the user equipment 20A performs unicast to the user equipment 20B and performs unicast to the user equipment 20C.

Figure 8:
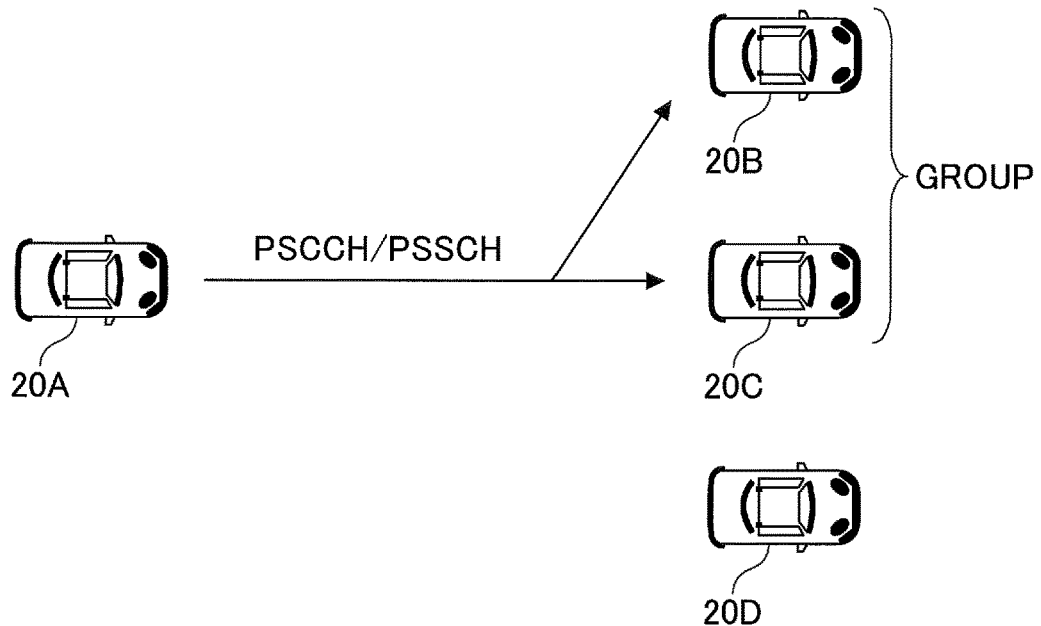
FIG. 8 is a diagram for illustrating an example (2) of a communication type of V2X.

FIG. 8 is a diagram for illustrating an example (2) of a communication type of V2X. The sidelink communication type illustrated in FIG. 8 is group cast. The user equipment 20A transmits PSCCH and PSSCH to a group to which one or more units of user equipment 20 belong. In the example illustrated in FIG. 8, the group includes the user equipment 20B and the user equipment 20C, and the user equipment 20A performs groupcast to the group.

Figure 9:
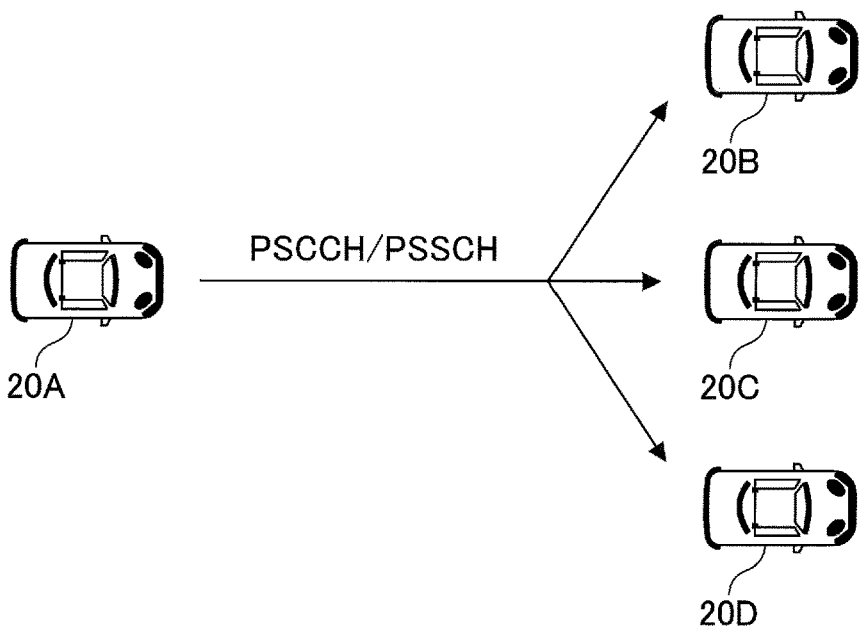
FIG. 9 is a diagram for illustrating an example (3) of a communication type of V2X.

FIG. 9 is a diagram for illustrating an example (3) of a communication type of V2X. The communication type of the sidelink illustrated in FIG. 9 is broadcast. The user equipment 20A transmits PSCCH and PSSCH to one or more units of user equipment 20. In the example illustrated in FIG. 9, the user equipment 20A performs broadcast to the user equipment 20B, the user equipment 20C, and the user equipment 20D.

In NR-V2X, HARQ is supported for unicast and groupcast of sidelink. Furthermore, in NR-V2X, Sidelink Feedback Control Information (SFCI) including a HARQ response is defined. Furthermore, it has been studied to transmit SFCI via a Physical Sidelink Feedback Channel (PSFCH).

Here, a PSSCH transmission for unicast or groupcast requires only one physical resource. However, for groupcast in which both ACK and NACK are transmitted as HARQ responses, a large number of PSFCH resources are to be consumed.

Accordingly, the following options 1) and 2) may be considered.

1) A HARQ response is transmitted only in the case of NACK, and all units of the user equipment 20 included in the group use one PSFCH resource to transmit the HARQ response.
2) A HARQ response is transmitted in the case of ACK and NACK, and every user equipment 20 included in the group uses a different PSFCH resource to transmit the HARQ response.

If the option 1) described above is adopted, there is an advantage in that the resources to be consumed are reduced. Whereas, if the option 2) described above is adopted, there is an advantage in that the reliability is improved.

Note that if the option 1) described above is adopted, the following a), b), and c) need to be executed appropriately:
  a) Processing in the case where there a conflict of NACKs transmitted from multiple units of the user equipment 20;
  b) Processing of identifying which user equipment 20 has transmitted the NACK; and
  c) How to configure the HARQ codebook.

Further, it is necessary to determine whether to adopt either the option 1) or the option 2), or to adopt both of the options 1) and 2).

Figure 10:
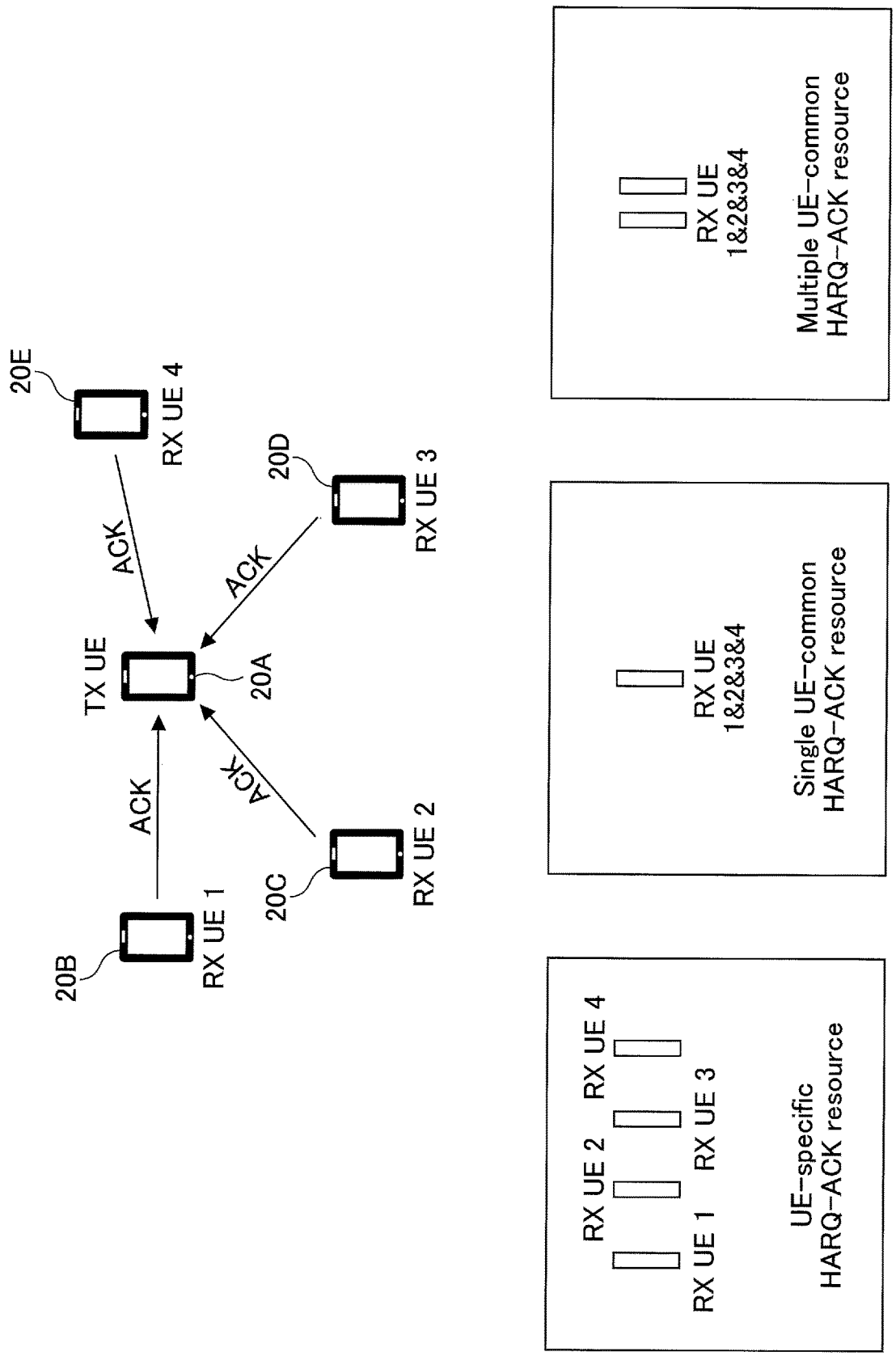
FIG. 10 is a diagram for illustrating an example of a HARQ response according to an embodiment of the present invention.

FIG. 10 is a diagram illustrating an example of HARQ responses according to an embodiment of the present invention. FIG. 10 illustrates an example in which a user equipment 20A as TX UE performs a groupcast transmission through PSSCHs to a user equipment 20B as RX UE1, a user equipment 20C as RX UE2, a user equipment 20D as RX UE3, and a user equipment 20E as RX UE4, and then, receives HARQ responses. The "UE-specific HARQ-ACK resource" illustrated in FIG. 10 is an example in which resources for HARQ responses are configured individually for the respective units of the user equipment 20. The "Single UE-common HARQ-ACK resource" illustrated in FIG. 10 is an example in which a single resource for HARQ responses is configured to be common to the units of the user equipment 20. The "Multiple UE-common HARQ-ACK resource" illustrated in FIG. 10 is an example in which multiple resources for HARQ responses are configured to be common to the units of the user equipment 20.

Here, the "Single UE-common HARQ-ACK resource" or "Multiple UE-common HARQ-ACK resource" are one or more resources for HARQ responses that are specified in advance or configured for groupcast or broadcast. When "Multiple UE-common HARQ-ACK Resource" is configured, each of the user equipment 20 selects one of the multiple resources for HARQ responses to transmit a HARQ response. As for the selection of a resource to transmit a HARQ response, for example, the user equipment 20 may select a resource from among the multiple resources for HARQ responses randomly.

The base station apparatus 10 or the user equipment 20 having scheduling capability may quasi-statically or dynamically configure each of the user equipment 20 to enable or disable HARQ feedback for groupcast or broadcast, based on RRC or Downlink Control Information (DCI). This configuration enables to control of the number of units of the user equipment 20 that perform feedback, the received power, and the like.

Furthermore, the user equipment 20 on the receiving side may respond with NACK, only if data decoding fails, and the Received Signal Strength Indicator (RSSI), Reference Signals Received Power (RSRP) or Reference Signal Received Quality (RSRQ), or Signal-to-Interference plus noise ratio (SINR) exceeds a predetermined threshold value. Note that the resources of the HARQ response may be distinguished in the time domain, may be distinguished in the frequency domain, or may be distinguished in the code domain. In other words, the resources of the HARQ response may be time-division multiplexed, frequency-division multiplexed, or code-division multiplexed.

Figure 11:
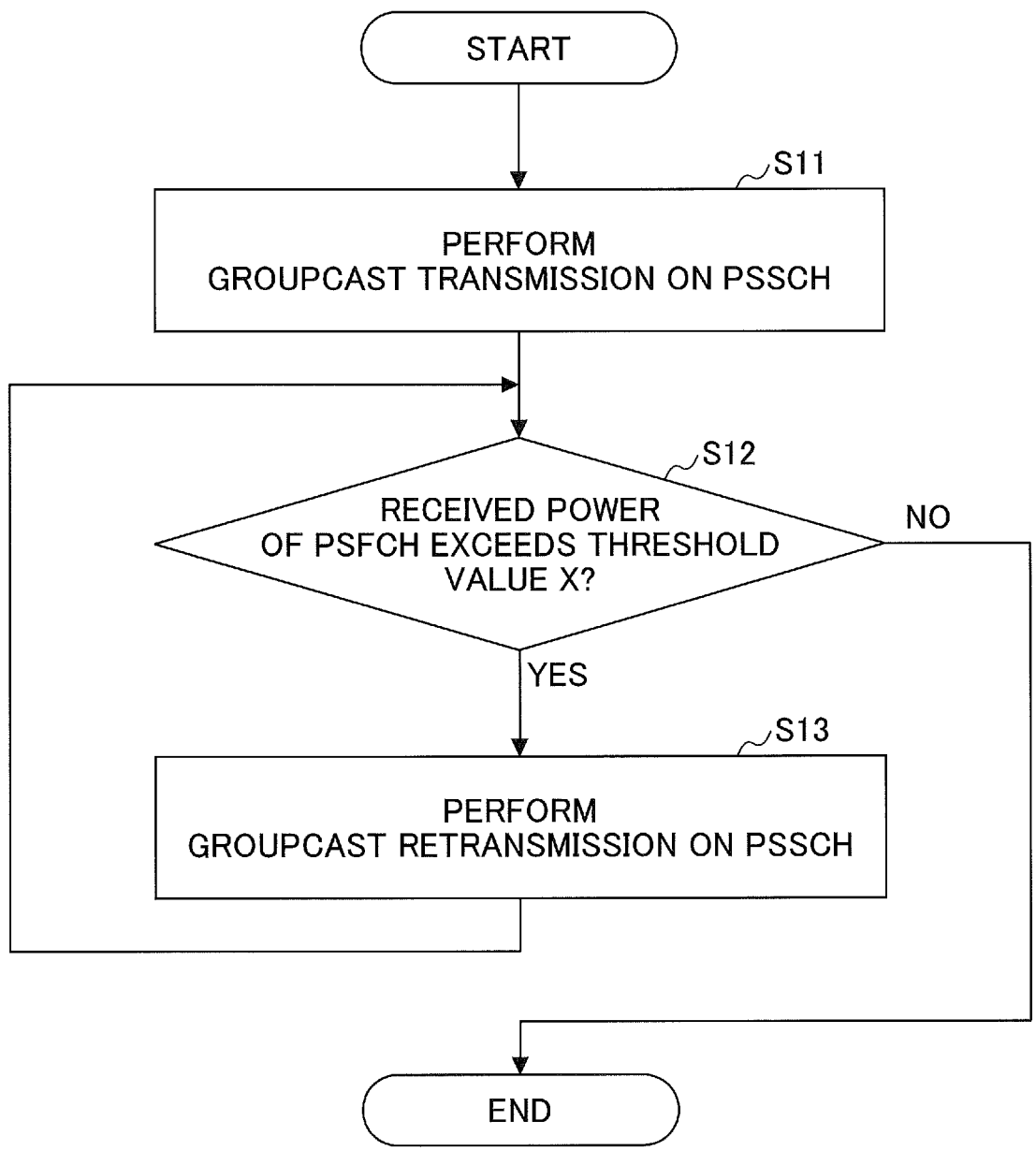
FIG. 11 is a flowchart for illustrating an example (1) of HARQ processing for groupcast according to an embodiment of the present invention.

FIG. 11 is a flow chart illustrating an example (1) of HARQ processing for groupcast according to an embodiment of the present invention. With FIG. 11, an example of the HARQ processing is described in the case of the option 1) above, namely, in the case where the HARQ response is transmitted only in the case of NACK, and every user equipment 20 included in the group uses a single PSFCH resource to transmit the HARQ response.

At Step S11, the user equipment 20 performs a groupcast transmission on the PSSCH. Next, the user equipment 20 determines whether or not the received power of the PSFCH exceeds a threshold value X (S12). If the received power of the PSFCH exceeds the threshold value X (YES at S12), the flow proceeds to Step S13; or if the received power of the PSFCH does not exceed the threshold value X (NO at S12), the flow ends. At Step S13, the user equipment 20 retransmits the groupcast in the PSSCH, and the flow returns to Step S12.

At Step S12, if the received power of the PSFCH exceeds the threshold value X, the user equipment 20 assumes that at least one of the units of the user equipment has failed in decoding the PSSCH and is transmitting NACK in the PSFCH. The user equipment 20 may perform retransmission of the groupcast in the PSSCH until NACK is no longer detected and/or the received power of the PSFCH does not exceed the threshold X. In this case, the user equipment 20 performing groupcast does not need to know which user equipment 20 is transmitting the NACK. The received power in the embodiments of the present invention may be, but is not limited to, Received Signal Strength Indicator (RSSI), Reference Signals Received Power (RSRP) or Reference Signal Received Quality (RSRQ), or Signal-to-Interference plus noise ratio (SINR). Furthermore, the threshold value X in the embodiments of the present invention may be specified in advance or may be dynamically indicated.

Here, considering a case where a large number of units of the user equipment 20 transmit NACK, the power in the PSFCH may be assumed to be excessive. Accordingly, the PSFCH corresponding to a groupcast may be allocated to be frequency-division multiplexed with other channels. For example, a guard band, a guard sub-carrier, a guard Physical Resource Block (PRB), a guard sub-channel, or the like may be arranged between the PSFCH corresponding to the groupcast and the other channels. Alternatively, the PSFCH corresponding to the groupcast may be time-division multiplexed with the other channels. The frequency-division multiplexed or time-division multiplexed allocation of the PSFCH described above may be specified in advice or configured by higher layer signaling such as RRC signaling.

Figure 12:
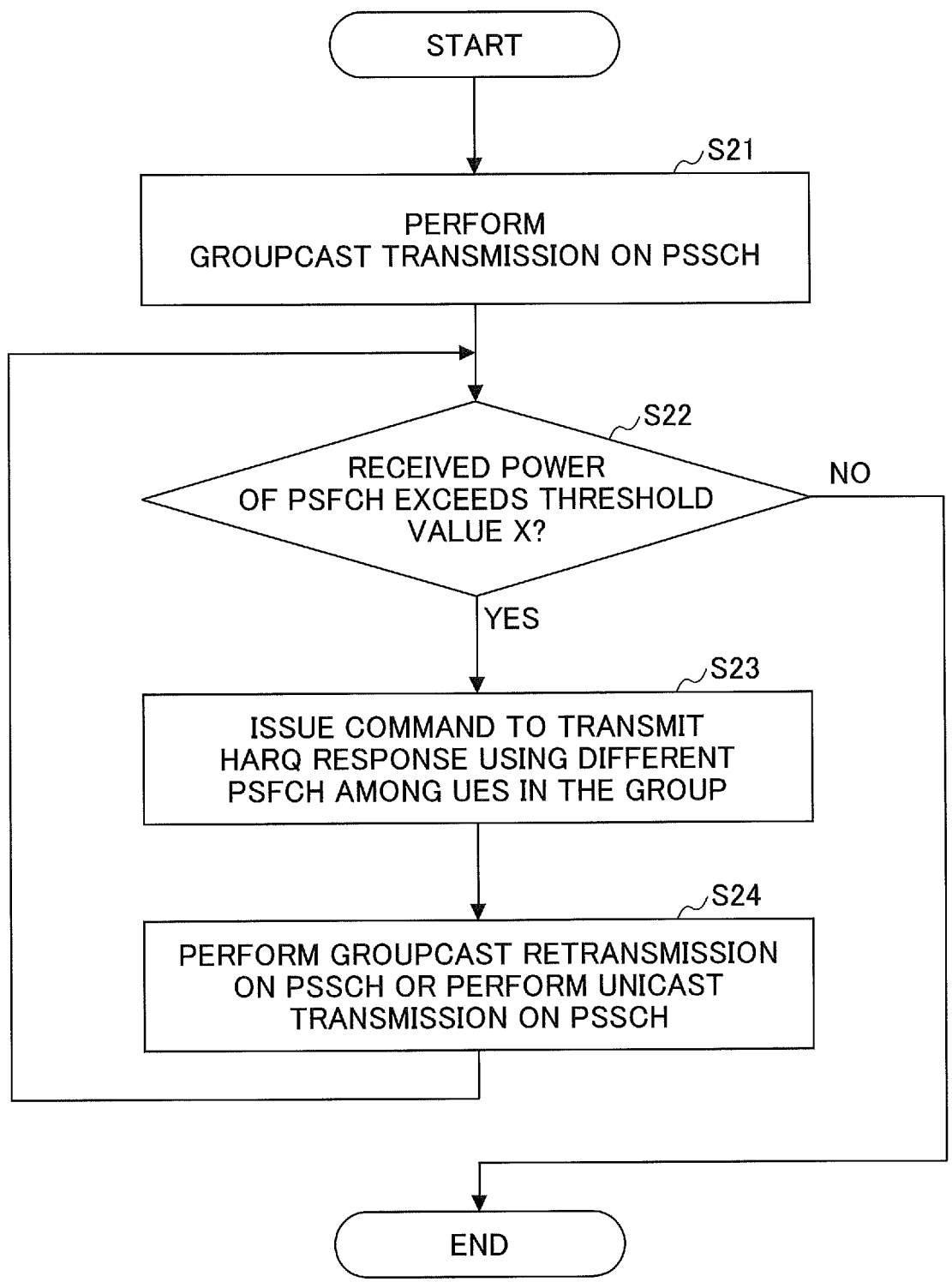
FIG. 12 is a flowchart for illustrating an example (2) of HARQ processing for groupcast according to an embodiment of the present invention.

FIG. 12 is a flow chart illustrating an example (2) of HARQ processing for groupcast according to an embodiment of the present invention. With FIG. 12, an example of the HARQ processing is described in the case of the option 1) above, namely, in the case where the HARQ response is transmitted only in the case of NACK, and every user equipment 20 included in the group uses a single PSFCH resource to transmit the HARQ response.

At Step S21, the user equipment 20 performs a groupcast transmission in the PSSCH. Next, the user equipment 20 determines whether or not the received power of the PSFCH exceeds the threshold value X (S22). If the received power of the PSFCH exceeds the threshold value X (YES at S22), the flow proceeds to Step S23; or if the received power of the PSFCH does not exceed the threshold value X (NO at S22), the flow ends. At Step S23, the user equipment 20 may indicate to transmit HARQ responses using PSFCHs different from each other among the UEs in the group. By receiving HARQ responses using different PSFCHs, the user equipment 20 that has performed the groupcast transmission can identify which user equipment 20 is transmitting the NACK. Next, at Step S24, the user equipment 20 may perform a retransmission of the groupcast transmission in the PSSCH or perform a unicast transmission including the content of the groupcast in the PSSCH to the identified user equipment 20 that transmitted the NACK, to return to Step S22.

The determination at Step S22 illustrated FIG. 12 may be a determination as to whether the detection rate of NACK is lower than a threshold value Y in addition to or instead of the determination as to whether the received power of the PSFCH exceeds the threshold value X. The "different PSFCHs" specified at Step S23 illustrated in FIG. 12 may be configured with slot numbers of PSFCH resources, for example, by an upper layer parameter or DCI. In the flow chart illustrated in FIG. 12, the user equipment 20 may perform a groupcast or unicast retransmission until the NACK is not detected and/or the received power of the PSFCH does not exceed the threshold X. Note that the threshold value Y in the embodiments of the present invention may be specified in advance or may be dynamically indicated.

In the following, HARQ codebooks applied to the PSFCH are described. A HARQ codebook is a method of reducing communication resources for responses by, for example, transmitting HARQ-NACK/ACKs of the PSSCHs collectively.

A HARQ codebook for HARQ responses corresponding to groupcast transmission may be configured separately from a HARQ codebook for HARQ responses corresponding to unicast transmission. For example, it may be assumed that PSFCH resources of a HARQ codebook with which HARQ responses corresponding to a groupcast transmission are transmitted, do not overlap PSFCH resources of a HARQ codebook with which HARQ responses corresponding to a unicast transmission are transmitted. Note that overlapping in the embodiments of the present invention may mean that at least the same time resources are allocated. In the case where the HARQ codebook for HARQ responses corresponding to groupcast transmission is configured separately from the HARQ codebook for HARQ responses corresponding to unicast transmission, for example, flexibility in resource scheduling is improved.

Furthermore, for example, it may be assumed that the PSFCH resources for the HARQ codebook with which HARQ responses corresponding to groupcast transmission are transmitted, are not transmitted in the same slot as the PSFCH resources for the HARQ codebook with which HARQ responses corresponding to unicast transmission are transmitted.

Furthermore, for example, in the case where the PSFCH resources for the HARQ codebook with which HARQ responses corresponding to a groupcast transmission are transmitted, overlap the PSFCH resources for the HARQ codebook with which HARQ responses corresponding to a unicast transmission are transmitted, either may be dropped.

Furthermore, for example, in the case where the PSFCH resources for the HARQ codebook with which HARQ responses corresponding to a groupcast transmission are transmitted in the same slot as the PSFCH resources for the HARQ codebook with which HARQ responses corresponding to a unicast transmission are transmitted, either may be dropped.

Furthermore, as an example of another HARQ codebook, a HARQ codebook may also include HARQ responses corresponding to a groupcast transmission and HARQ responses corresponding to a unicast transmission. In the Sidelink Control Information (SCI) that schedules the PSSCH to be used for unicast or groupcast, in the case where a field (e.g., "PSSCH-to-HARQ feedback timing indicator field") specifying a slot to perform the HARQ response specifies the same slot, the HARQ response corresponding to unicast or groupcast may be transmitted with a single PSFCH resource.

Furthermore, in the SCI that schedules the PSSCH to be used for unicast or groupcast, in the case where a field (e.g., "PSSCH-to-HARQ_feedback timing indicator field") specifying a slot to perform the HARQ response specifies the same slot, the PSFCH resource for the HARQ response may be determined by the PSFCH resource indicator field included in the latest SCI among the multiple SCIs that schedule the PSSCH to be used for unicast.

The following describes whether to adopt either the option 1) or the option 2), or to adopt both of the options 1) and 2).

Switching between execution of the option 1) and execution of the option 2) may be allowed. In other words, which one of the following is to be used may be switched: 1) an operation in which a HARQ response is transmitted only in the case of NACK, and all units of the user equipment 20 included in the group use one PSFCH resource to transmit the HARQ response; and 2) an operation in which a HARQ response is transmitted in the case of ACK and NACK, and each of the units of the user equipment 20 included in the group uses a different PSFCH resource to transmit the HARQ response.

For example, it may be configured to allow switching between execution of the option 1) and execution of the option 2), by SCI or DCI that schedules the PSSCH.

Furthermore, for example, it may be configured to allow explicitly switching between execution of the option 1) and execution of the option 2), by a new higher-layer parameter (e.g., "PSSCH-HARQ-feedback"="NACK only" or "ACK and NACK").

Furthermore, for example, it may be configured to allow implicitly switching between execution of the option 1) and execution of the option 2), by the new higher-layer parameter. For example, in the case where the higher layer parameter is set to URLLC (Ultra-Reliable and Low Latency Communications) (e.g., in the case where the parameter indicating a unit in which multiple HARQ-ACKs in HARQ responses are collected into one HARQ-ACK codebook indicates less than one slot (e.g., "HARQ-feedback resolution"=half slot)), switching to the option 2) above may be applied. For example, in the case where the higher layer parameter is set to eMBB (enhanced Mobile Broadband) (e.g., in the case where the parameter indicating a unit in which multiple HARQ-ACKs in HARQ responses are collected into one HARQ-ACK codebook indicates one slot (e.g., "HARQ-feedback resolution"=one slot)), switching to the option 1) above may be applied.

Furthermore, for example, it may be configured to allow implicitly switching between execution of the option 1) and execution of the option 2), by a Radio Network Temporary Identifier (RNTI) used for scrambling the SCI or DCI.

Furthermore, for example, it may be configured to allow implicitly switching between executing the option 1) or the option 2) according to an MCS table. For example, in the case where the MCS table is configured to include a lower encoding rate, switching to the option 2) above may be applied, and in the case where the MCS table is configured to include a higher encoding rate, switching to the option 1) above may be applied.

According to the embodiments described above, in the case of executing groupcast in the sidelink, the user equipment 20 may measure the power in the PSFCH to detect the HARQ response, so as to perform retransmission control. Furthermore, the user equipment 20 can appropriately specify a HARQ codebook to be used for groupcast in the sidelink. Furthermore, in the case of executing groupcast in the sidelink, the user equipment 20 may switch between receiving only NACK as the HARQ response in one PSFCH, and receiving ACK or NACK in multiple PSFCHs.

In other words, retransmission control can be performed appropriately in direct communication between terminals.

(Device Configuration)

Next, a functional configuration example of each of the base station apparatus 10 and the user equipment 20 that execute the processes and the operation described so far is described. Each of the base station apparatus 10 and the user equipment 20 has the function of implementing the embodiments. Here, each of the base station apparatus 10 and the user equipment 20 may have only some of the functions in the embodiments.

<Base Station Apparatus 10>

Figure 13:
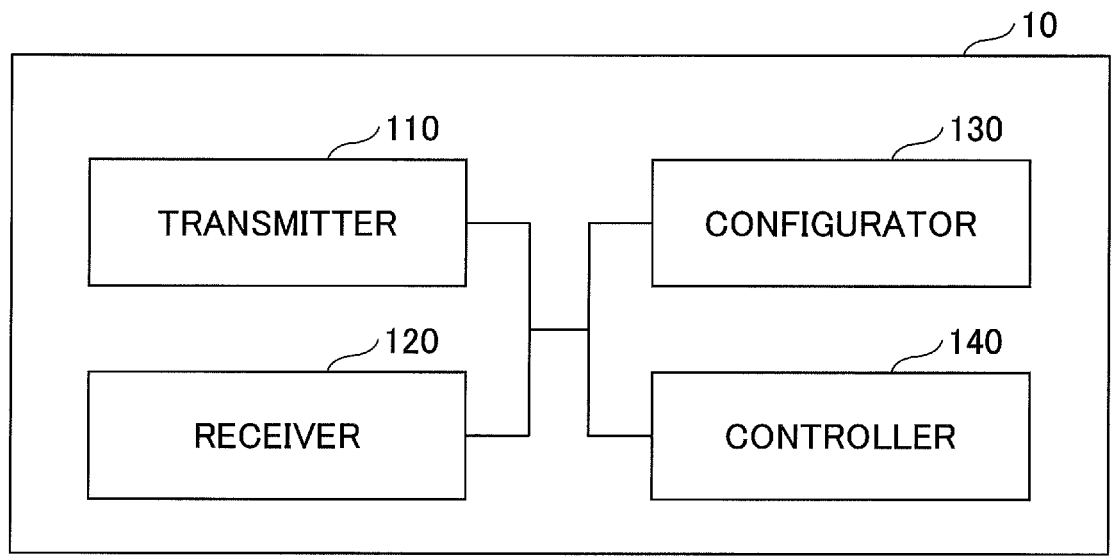
FIG. 13 is a diagram illustrating an example of a functional configuration of a base station apparatus 10 according to an embodiment of the present invention.

FIG. 13 is a diagram illustrating an example of a functional configuration of the base station apparatus 10. As illustrated in FIG. 13, the base station apparatus 10 has a transmitter 110, a receiver 120, a configurator 130, and a controller 140. The functional configuration illustrated in FIG. 13 is merely an example. As long as the operation according to the embodiments of the present invention can be executed, the functional classification and the name of the functional unit may be any classification and name.

The transmitter 110 has a function of generating a signal to be transmitted to the user equipment 20 and transmitting the signal through radio. The receiver 120 has a function of receiving various types of signals transmitted from the user equipment 20 and obtaining, for example, information of a higher layer from the received signals. The transmitter 110 has a function of transmitting the NR-PSS, the NR-SSS, the NR-PBCH, the DL/UL control signal, the DL reference signal or the like to the user equipment 20.

The configurator 130 stores pre-configured configuration information and various types of configuration information to be transmitted to the user equipment 20 in the storage device and reads the configuration information from the storage device if necessary. For example, content of the configuration information is, for example, information related to a configuration of the D2D communication or the like.

As described in the embodiments, the controller 140 performs a process related to the configuration used for the user equipment 20 to perform the D2D communication. Furthermore, the controller 140 transmits scheduling for D2D communication to the user equipment 20 through the transmitter 110. A functional unit related to signal transmission in the controller 140 may be included in the transmitter 110, and a functional unit related to signal reception in the controller 140 may be included in the receiver 120.

<User Equipment 20>

Figure 14:
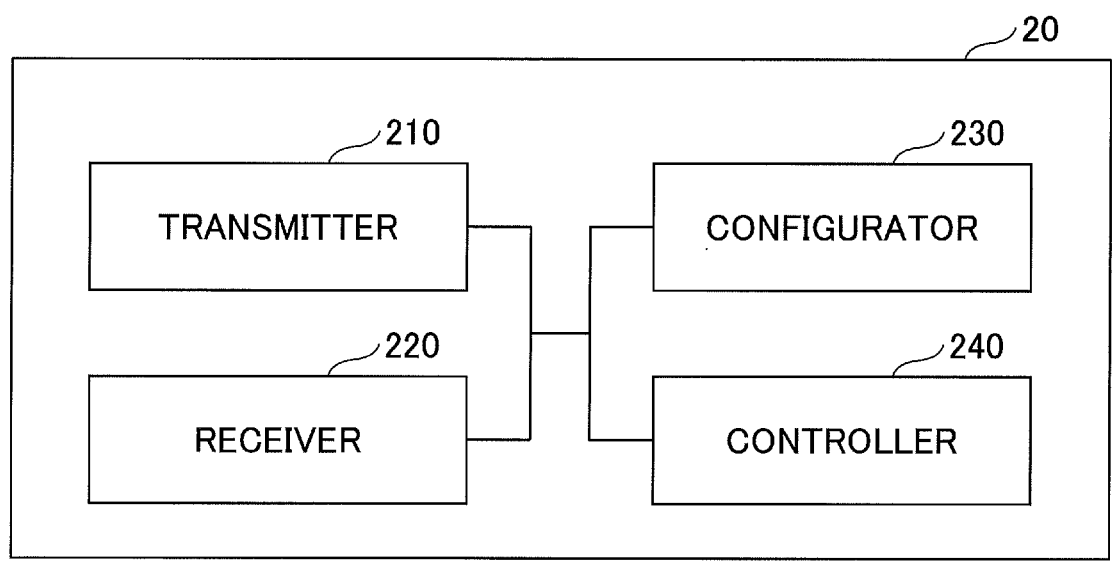
FIG. 14 is a diagram illustrating an example of a functional configuration of a user equipment 20 according to an embodiment of the present invention.

FIG. 14 is a diagram illustrating an example of a functional configuration of the user equipment 20. As illustrated in FIG. 14, the user equipment 20 has a transmitter 210, a receiver 220, a configurator 230, and a controller 240. The functional configuration illustrated in FIG. 14 is merely an example. As long as the operation according to the embodiments of the present invention can be executed, the functional classification and the name of the functional unit may be any classification and name.

The transmitter 210 generates a transmission signal from transmission data and transmits the transmission signal through radio. The receiver 220 receives various types of signals through radio, and obtains a signal of a higher layer from a received signal of a physical layer. The receiver 220 also has a function of receiving the NR-PSS, the NR-SSS, the NR-PBCH, the DL/UL/SL control signal, a reference signal, or the like transmitted from the base station apparatus 10. Furthermore, for example, the transmitter 210 may transmit a physical sidelink control channel (PSCCH) a physical sidelink shared channel (PSSCH), a physical sidelink discovery channel (PSDCH), a physical sidelink broadcast channel (PSBCH), and the like to any other user equipment 20 as the D2D communication, and the receiver 220 receives the PSCCH, the PSSCH, the PSDCH, the PSBCH, and the like from any other user equipment 20.

The configurator 230 stores various types of configuration information received from the base station apparatus 10 or the user equipment 20 through the receiver 220 in the storage device and reads the configuration information from the storage device if necessary. The configurator 230 also stores pre-configured configuration information. For example, content of the configuration information is, for example, information related to the configuration of the D2D communication or the like.

The controller 240 controls D2D communication with other user equipment 20 as described above in the embodiments. Furthermore, the controller 240 performs a process related to HARQ for D2D communication. The controller 240 may schedule D2D communication for another user equipment 20. A functional unit related to signal transmission in the controller 240 may be included in the transmitter 210, and a functional unit related to signal reception in the controller 240 may be included in the receiver 220.

<Hardware Configuration>

The block diagrams (FIG. 13 and FIG. 14) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 15:
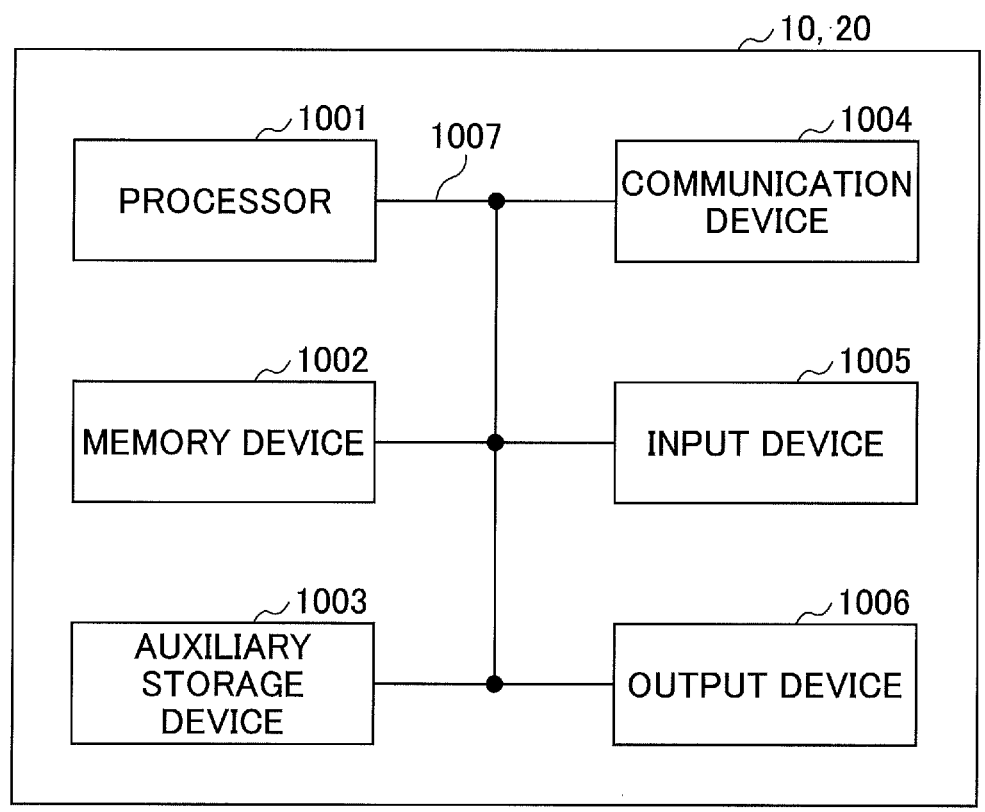
FIG. 15 is a diagram illustrating an example of a hardware configuration of the base station apparatus 10 or the user equipment 20 according to an embodiment of the present invention.

For example, the base station apparatus 10, the user equipment 20, or the like in an embodiment of the present invention may function as a computer for performing a process of radio communication method according to the present disclosure. FIG. 15 is a diagram illustrating an example of a hardware configuration of the base station apparatus 10 and the user equipment 20 according to an embodiment of the present disclosure. Each of the base station apparatus 10 and the user equipment 20 described above may be physically configured as a computer device including a processor 1001, a memory device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station apparatus 10 and the user equipment 20 may be configured to include one or more of each device depicted, or may be configured without including some devices.

Each function in each of the base station apparatus 10 and the user equipment 20 is implemented such that predetermined software (program) is read on hardware such as the processor 1001, the memory device 1002 and the like, and the processor 1001 performs an operation and controls communication by the communication device 1004 and at least one of reading and writing of data in the memory device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the above-described controller 140, the controller 240, and the like may be implemented by the processor 1001.

Furthermore, the processor 1001 reads a program (program code), a software module, data, or the like from at least one of the auxiliary storage device 1003 and the communication device 1004 out to the memory device 1002, and executes various types of processes according to them. A program causing a computer to execute at least some of the operations described in the above embodiments is used as the program. For example, the controller 140 of the base station apparatus 10 illustrated in FIG. 13 may be implemented by a control program which is stored in the memory device 1002 and operates on the processor 1001. Furthermore, for example, the controller 240 of the user equipment 20 illustrated in FIG. 14 may be implemented by a control program which is stored in the memory device 1002 and operates on the processor 1001. Various types of processes are described to be executed by one processor 1001 but may be executed simultaneously or sequentially by two or more processors 1001. The processor 1001 may be implemented by one or more chips. The program may be transmitted from a network via an electric communication line.

The memory device 1002 is a computer readable recording medium and configured with at least one of a read only memory (ROM), an erasable programmable ROM (EPROM), an electrically erasable programmable ROM (EEPROM), a random access memory (RA), and the like. The memory device 1002 is also referred to as a "register," a "cache," a "main memory," or the like. The memory device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The above-described storage medium may be, for example, a database, a server, or any other appropriate medium including at least one of the memory device 1002 and the auxiliary storage device 1003.

The communication device 1004 is hardware (a transmitting and receiving device) for performing communication between computers via at least one of a wired network and a wireless network and is also referred to as a "network device," a "network controller," a "network card," a "communication module," or the like. The communication device 1004 may be configured to include a high frequency switch, a duplexer, a filter, a frequency synthesizer, and the like to implement at least one of frequency division duplex (FDD) and time division duplex (TDD). For example, transmitting and receiving antennas, an amplifier, a transceiver, a transmission line interface, and the like may be implemented by the communication device 1004. The transceiver may be implemented such that a transmitter and a receiver are physically or logically separated.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The respective devices such as the processor 1001 and the memory device 1002 are connected by the bus 1007 to communicate information with each other. The bus 1007 may be configured 25Z with a single bus or may be configured with different buses between the devices.

Furthermore, each of the base station apparatus 10 and the user equipment 20 may be configured to include hardware such as a microprocessor, a digital signal processor (DSP), an application specific integrated circuit (ASIC), a programmable logic device (PLD), or a field programmable gate array (FPGA), or all or some of the functional blocks may be implemented by hardware. For example, the processor 1001 may be implemented by at least one of these hardware components.

Conclusion of the Embodiments

As described above, according to the embodiments of the present invention, there is provided a user equipment including a transmitter that performs a groupcast transmission to a group including a plurality of units of user equipment; a receiver that receives a hybrid automatic repeat request (HARQ) response to the groupcast transmission; and a controller that performs retransmission control for the groupcast based on received power that is measured on a channel for receiving the HARQ response.

According to the above-described configuration, when the user equipment 20 performs groupcast in sidelink, the user equipment 20 can detect a HARQ response and perform retransmission control by measuring power on PSFCH. Namely, in the inter-terminal direct communication, retransmission control can be appropriately performed.

When the received power that is measured on the channel for receiving the HARQ response exceeds a predetermined threshold value, the controller may perform retransmission of the groupcast transmission. With this configuration, when groupcast is performed in sidelink, by measuring power on PSFCH, a HARQ response can be detected and retransmission control can be performed.

A guard area may be provided between the channel for receiving the HARQ response and another channel. With this configuration, even if power of PSFCH is high, an effect on adjacent channels can be reduced.

When the received power that is measured on the channel for receiving the HARQ response exceeds a predetermined threshold value, the controller may transmit to the plurality of units of user equipment a command to transmit HARQ responses using mutually different channels. With this configuration, when the user equipment performs groupcast, the user equipment can identify which user equipment fails to receive.

The controller may identify which one of the plurality of units of user equipment is transmitting a HARQ response, based on the HARQ responses transmitted from the plurality of units of user equipment according to the command to transmit the HARQ responses using the different channels. With this configuration, when the user equipment performs groupcast, the user equipment can identify which user equipment fails to receive.

The controller may perform a unicast transmission including content of the groupcast to the identified user equipment. With this configuration, when the user equipment performs groupcast, the user equipment can perform communication with high resource utilization efficiency by performing the unicast transmission to the user equipment that fails to receive.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the base station apparatus 10 and the user equipment 20 are described using the functional block diagrams, but such devices may be implemented by hardware, software, or a combination thereof. Software executed by the processor included in the base station apparatus 10 according to the embodiments of the present invention and software executed by the processor included in the user equipment 20 according to the embodiments of the present invention may be stored in a random access memory (RAN), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present disclosure and may be provided by any other method. For example, the notification of information may be provided by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA) new Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in this specification may be reversed in order provided that there is no contradiction. For example, the method described in the present disclosure presents elements of various steps with an exemplary order and is not limited to a presented specific order.

In this specification, a specific operation to be performed by the base station apparatus 10 may be performed by an upper node in some cases. In the network including one or more network nodes including the base station apparatus 10, various operations performed for communication with the user equipment 20 can be obviously performed by at least one of the base station apparatus 10 and any network node (for example, an MME, an S-GW, or the like is considered, but it is not limited thereto) other than the base station apparatus 10. A case is exemplified above in which there is one network node other than the base station apparatus 10. The one network node may be a combination of a plurality of other network nodes (e.g., MME and S-GW).

Information, a signal, or the like described in the present disclosure may be output from an upper layer (or a lower layer) to a lower layer (or an upper layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in this disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "base station (BS)," "radio base station," "base station apparatus," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmitting device, a receiving device, a communication device, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of units of user equipment 20 (for example, which may be referred to as device-to-device (D2D) or vehicle-to-everything (V2X)). In this case, the user equipment 20 may have the functions of the base station apparatus 10 described above. Further, the terms "uplink" and "downlink" may be replaced with terms (for example, "side") corresponding to inter-terminal communication. For example, an uplink channel, a downlink channel, or the like may be replaced with side channels.

Similarly, the user terminal in the present disclosure may be replaced with the base station. In this case, the base station may have the functions of the above-mentioned user terminal.

The term "determining" used in this specification may include a wide variety of actions. For example, "determining" may include, for example, events in which events such as judging, calculating, computing, processing, deriving, investigating, looking up, search, and inquiry (for example, looking up in a table, a database, or another data structure), or ascertaining are regarded as "determining." Further, "determining" may include, for example, events in which events such as receiving (for example, receiving information), transmitting (for example, transmitting information), input, output, or accessing (for example, accessing data in a memory) are regarded as "determining." Further, "determining" may include, for example, events in which events such as resolving, selecting, choosing, establishing, or comparing are regarded as "determining." In other words, "determining" may include events in which a certain operation is regarded as "determining." Further, "determining" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based only on" unless otherwise stated. In other words, a phrase "based on" means both "based only on" and "based on at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Furthermore, "means" in the configuration of each of the above-described devices may be replaced with "unit," "circuit," "device," or the like.

In a case in which "include," "including," and variations thereof are used in the present disclosure, these terms are intended to be comprehensive, similar to a term "provided with (comprising)." Further, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a subframe, a slot, a mini slot, and a symbol indicates a time unit for transmitting a signal. As a radio frame, a subframe, a slot, a mini slot, and a symbol, different names respectively corresponding to them may be used.

For example, one subframe may be referred to as a transmission time interval (TTI: Transmission Time Interval), or a plurality of consecutive subframes may be referred to as a TTI, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of assigning a radio resource (a frequency bandwidth, a transmission power, or the like which can be used in each user equipment 20) to each user equipment 20 in units of TTIs. The definition of the TTI is not limited thereto.

The TTI may be a transmission time unit such as a channel coded data packet (transport block), a code block, or a code word, or may be a processing unit such as scheduling or link adaptation. Furthermore, when a TTI is provided, a time interval (for example, the number of symbols) in which a transport block, a code block, a code word, or the like is actually mapped may be shorter than the TTI.

Note that, when one slot or one mini slot is referred to as a TTI, one or more TTIs (that is, one or more slots or one or more mini slots) may be a minimum time unit of scheduling. Further, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Note that, a long TTI (for example, a common TTI, a subframe, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology.

Furthermore, a time domain of an RB may include one or more symbols and may be a length of one slot, one mini slot, one subframe, or one TTI. Each of one TTI, one subframe, or the like may be formed of one or more resource blocks.

Furthermore, one or more RBs may be referred to as a physical resource block (PRB), a subcarrier group (SCG), a resource element group (REG), a PRB pair, an RB pair, or the like.

Furthermore, a resource block may be formed of one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it may not be assumed that the UE transmits and receives a predetermined signal/channel outside an active BWP. Further, a "cell," a "carrier," or the like in the present disclosure may be replaced with a "BWP."

Structures of the radio frame, the sub frame, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the entire present disclosure, for example, when an article such as "a," "an," or "the" in English is added by a translation, the present disclosure may include a case in which a noun following the article is the plural.

In the present disclosure, a term "A and B are different" may mean "A and B are different from each other." Furthermore, the term may mean "each of A and B is different from C." Terms such as "separated," "coupled," or the like may also be interpreted in similarly to "different."

Each aspect/embodiment described in this specification may be used alone, in combination, or may be switched in accordance with the execution. Furthermore, notification of predetermined information (for example, notification of "being X") is not limited to an explicit method, and may be performed by an implicit method (e.g., not performing notification of the predetermined information).

Note that, in the present disclosure, the sidelink communication is an example of inter-terminal direct communication. A PSFCH is an example of a channel for receiving a HARQ response. A guard band, a guard subcarrier, a guard Physical Resource Block (PRB) or a guard channel is an example of a guard area.

Although the present disclosure is described above in detail, it is obvious to those skilled in the art that the present disclosure is not limited to the embodiments described in the present disclosure. The present disclosure may be implemented as revised and modified embodiments without departing from the gist and scope of the present disclosure as set forth in claims. Accordingly, the description of the present disclosure is for the purpose of illustration and does not have any restrictive meaning to the present disclosure.

LIST OF REFERENCE SYMBOLS 10 base station apparatus
110 transmitter
120 receiver
130 configurator
140 controller
20 user equipment
210 transmitter
220 receiver
230 configurator
240 controller
1001 processor
1002 memory device
1003 auxiliary storage device
1004 communication device
1005 input device
1006 output device

The invention claimed is:

1. A terminal comprising:
a receiver that receives a unicast and a groupcast in inter-terminal direct communication;
a controller that separately configures a first hybrid automatic repeat request (HARQ) response for the unicast and a second HARQ response for the groupcast; and a transmitter that transmits at least one of the first HARQ response or the second HARQ response, wherein the controller determines, based on control information that schedules the unicast or the groupcast, whether the HARQ response includes ACK or NACK, or the HARQ response includes only NACK, and wherein, when a first resource of a feedback channel for transmitting the first HARQ response overlaps a second resource of the feedback channel for transmitting the second HARQ response, the controller does not transmit the first HARQ response or the second HARQ response.

2. A radio communication system comprising:
a first terminal; and
a second terminal,
wherein the first terminal includes:
- a receiver that receives a unicast and a groupcast in inter-terminal direct communication;
- a controller that separately configures a first hybrid automatic repeat request (HARQ) response for the unicast and a second HARQ response for the groupcast; and
- a transmitter that transmits at least one of the first HARQ response or the second HARQ response, wherein the controller determines, based on control information that schedules the unicast or the groupcast, whether the HARQ response includes ACK or NACK, or the HARQ response includes only NACK, and wherein, when a first resource of a feedback channel for transmitting the first HARQ response overlaps a second resource of the feedback channel for transmitting the second HARQ response, the controller does not transmit the first HARQ response or the second HARQ response, and wherein the second terminal includes:
- a transmitter that transmits the unicast and the groupcast; and
- a receiver that receives at least one of the first HARQ response or the second HARQ response.

3. A communication method executed by a terminal, the method comprising:
- receiving a unicast and a groupcast in inter-terminal direct communication;
- separately configuring a first hybrid automatic repeat request (HARQ) response for the unicast and a second HARQ response for the groupcast;
- transmitting at least one of the first HARQ response or the second HARQ response; and
- determining, based on control information that schedules the unicast or the groupcast, whether the HARQ response includes ACK or NACK, or the HARQ response includes only NACK, wherein, when a first resource of a feedback channel for transmitting the first HARQ response overlaps a second resource of the feedback channel for transmitting the second HARQ response, the first HARQ response or the second HARQ response is not transmitted.

* * * * *